United States Patent [19]
Zirm

[11] Patent Number: 4,947,474
[45] Date of Patent: Aug. 7, 1990

[54] MECHANISM OF OBSERVATION AND RECORDING OPERATION ON AN OBJECT

[76] Inventor: Mathias Zirm, Fallmerayerstrasse 3, Innsbruck, Austria, 6020

[21] Appl. No.: 261,619

[22] Filed: Oct. 24, 1988

[51] Int. Cl.$^5$ .............................................. H04N 7/18
[52] U.S. Cl. ..................................... 358/93; 358/107; 351/221
[58] Field of Search ............... 358/101, 107, 93, 106; 343/267, 270, 271; 128/303.1; 351/221, 206

[56] References Cited

U.S. PATENT DOCUMENTS

| | | | |
|---|---|---|---|
| 4,063,282 | 12/1977 | Exton | 358/106 |
| 4,115,802 | 9/1978 | Kramer et al. | 358/93 |
| 4,200,362 | 4/1980 | Pomerantzeff | 351/206 |
| 4,647,208 | 3/1987 | Buman | 358/106 |
| 4,672,559 | 6/1987 | Jansson et al. | 358/93 |
| 4,691,231 | 9/1987 | Fitzmorris | 358/107 |
| 4,710,808 | 12/1987 | Hoogenboom et al. | 358/107 |
| 4,737,845 | 4/1988 | Suzuki et al. | 358/101 |
| 4,769,698 | 9/1988 | Ledley et al. | 358/93 |

*Primary Examiner*—John K. Peng
*Attorney, Agent, or Firm*—Paul H. Gallagher

[57] ABSTRACT

An eye, having a rear opening opposite the pupil and is supported on a microscope slide, with the rear opening downward, and secured thereto with glue, surrounding the rear opening. An observation component including a video camera and a microscope is positioned above and directed downwardly through the pupil, and another is positioned below and directed upwardly through the rear opening. The pictures from the video cameras are presented on monitors, each individually, and blended. Lights are directed through the pupil and rear opening at an oblique angle to the ocular axis, and foot controls individually control movement of the observation components toward and from the eye.

14 Claims, 2 Drawing Sheets

MECHANISM OF OBSERVATION AND RECORDING OPERATION ON AN OBJECT

FIELD OF THE INVENTION

The invention resides in the general field of performing an operation on an object, and observing the operation, and recording the operation.

The overall scope of the invention is such as to cover operations on any of various kinds of objects, and observing and recording the operation. The invention has to do particularly with performing an operation on the human eye, and the eye consists of a specific example of an object on which the operation can be performed.

The intricacy and sensitiveness of the human eye requires the utmost in skill, and to exercise the greatest skill, a corresponding accuracy in observation is of great help, if not actually necessary.

Operations on the eye have been attempted before, as for example by Miyake, as found in the publication, Miyake, K.: Experimental Study of the Placement of Posterior Chamber Lens Style in the Eye. See audiovisual library of Cilco, No. 9042010. An observation was conducted in such a case, by filming the cadaver eye which was opened on the rear side, that operation being a lens implantation. The filming was conducted under great technological difficulties with a 16 millimeter film camera, but was not considered satisfactory because the steps in the operation could not be observed well.

THE SPECIFIC CASE OF OPERATION ON THE EYE AND OBSERVING AND RECORDING IT

Video mechanism possesses capabilities of performing steps covered by the present invention, that were not capable of being performed before.

IDENTIFICATION OF ELEMENTS OF THE APPARATUS

As used herein, the word picture is generic to photographs taken by a photographic camera, and images produced by video apparatus, such as presented or reproduced on a monitor or screen.

The term film is generic to cover the usual negative film of a photographic camera, and the tape of a video camera.

OBJECTS OF THE INVENTION

A broad object of the invention is to provide video apparatus, and method associated therewith, for observing and recording the operation on an object.

A more specific object is to provide such video apparatus for observing and recording such operation on an eye.

Another object is to provide a novel arrangement of multiple video cameras for producing corresponding multiple pictures, and mixing the pictures to form composite pictures to provide more full and effective observation and recording of the operation.

A more specific object is to provide such multiple video cameras as just referred to, in the use of which observation and recording can be made of both the interior, or inner side, and the exterior, or outer side, of the eye, simultaneously and synchronously.

Still another object is to provide video mechanism of the character referred to in conjunction with microscopes, for observing great detail of the steps in the operation and the recording thereof.

Still another object is to provide in conjunction with the apparatus as referred to, novel lighting means for lighting the eye during the operation, including an arrangement in which the various ones of a plurality of lighting sources do not mutually interfere, or cancel out, or otherwise adversely affect clear observation of the operation.

An additional object is to provide a novel arrangement of the mechanism, and the support of the eye for the operation, whereby a great amount of light can be introduced into the interior of the eye.

Another important and broad object is the utilization of a plurality of (two) video cameras and sychronizing or blending the pictures produced thereby, such as on a monitor, and thereby enabling observations of different elements of the eye, and compare the relative movement between the elements, such as views from the outside with views from the inside, and determine measurements of the movements of those elements.

Still another object is to provide apparatus and method of the foregoing character, utilizing opposed microscopes through which the pictures are taken, and the incorporation of a lighting arrangement utilizing light sources exterior to the microscopes and directing the light at the eye in such a way as to eliminate any opposition of the lighting through the microscopes, such as directing the lights against each other and mutually blinding as has occurred heretofore.

Still another object is to provide apparatus and method of the character referred to just immediately above, wherein the lighting means is mounted independently of the microscopes and totally free of any positioning, proportioning, or axial relationship, of the microscopes whereby to provide the maximum illumination without any counteraction or adverse effect as between the lighting and the microscopes, or on the person performing the operation.

A still further object is to provide apparatus and method of the character referred to just immediately hereinabove, whereby the microscopes and the lighting sources are all adjustable, and independently so adjustable, so as to provide maximum lighting under virtually all conditions and circumstances.

A still further object is to provide filter means in the microscope so as to prevent damage to the retina of the eye of the observer.

DESCRIPTION OF A PREFERRED EMBODIMENT

Figure 1:
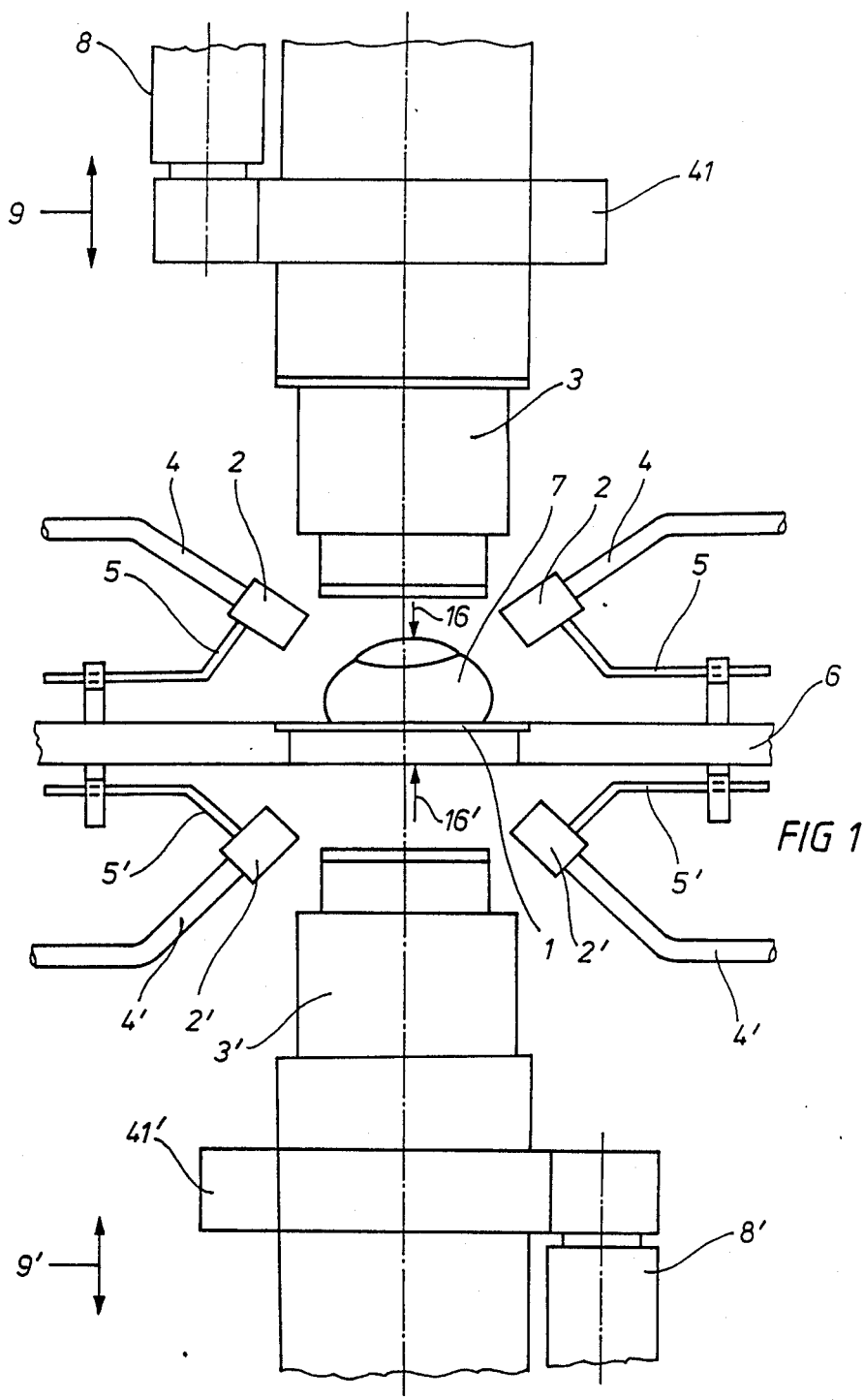
FIG. 1 is a semi-diagrammatic view of the mechanism for observing and recording operations on the object.

The mechanism in its preferred form includes a plate 6 provided with an aperture which is covered by a microscope slide 1 made of material that is as nearly transparent as possible. The object to be operated on, in this case an eye of a cadaver, is indicated at 7 and has an opening 14 on its rear side, and it is fastened in position by suitable means, such as cement, or glue 15. For observation of the object, on the upper side is a microscope 3, and on the underside is a microscope 3' directed upwardly at the lower side of the object. Associated with each of the microscopes is lighting means 2, 2', which are directed obliquely to the optical axis of the microscopes, and include means 4, 4', for positioning and directing the means 2, 2', in the directions desired, the latter being fastened on supports 5, 5', with flexible cables. Such oblique positioning of the lighting means prevents any mutual blinding effects in the microscopes. Light filters may be placed in the oculars of the microscopes.

The microscopes 3, 3', are adjustably mounted by known means (not shown) for vertical movement, as indicated by the arrows 9, 9'. Also the focal lengths of the microscopes are adjustable for synchronously focusing the microscopes, preferably by foot controls, including one control for actuation by one foot for controlling the microscope 3 and another for controlling the microscope 3'.

Figure 2:
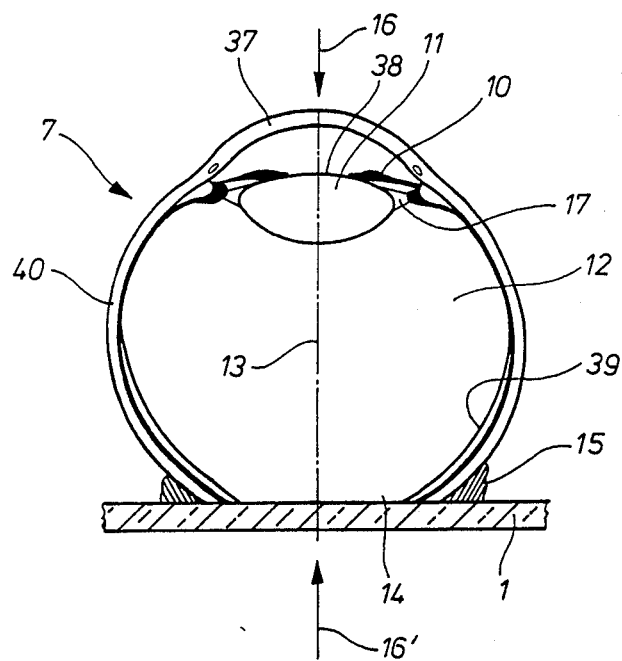
FIG. 2 is a cross sectional view through an object (eye) included in FIG. 1, and including the support element for the object.

On each of the microscopes 3, 3', is a mounting means 41, by which a video camera 8, 8', is mounted. Accordingly the cameras 8, 8', act through the corresponding microscopes as referred to hereinbelow and illustrated in FIG. 2.

The video camera 8 views in the direction of the arrow 16 through the pupil 38 of the eye into the interior, from above, and the cornea 37 may remain in its original position or be removed, as desired.

The upper video camera now sees through the intraocular lens 11 in front of the body 12 of vitreous humor, sometimes referred to as "glass", only through the pupil 38 which is surrounded by the iris 10 which is in the direction of the arrow 16, but in this view it is not discernible how an artificial intraocular lens 11 is anchored in the capsule sack 17 behind the iris 10.

The rear opening 14 is provided in the eye, and in viewing the eye from the rear, that opening is presented, and since the eye is resting on the slide 1, the latter forms a closure to the opening. Around the opening 14, the cement or glue 15 is applied to secure the eye to the slide.

The opening 14 need not lie normal to the ocular axis 13, but can instead be arranged at an oblique angle thereto.

The lower video camera 8', viewing through the lower microscope 3' in the direction of the arrow 16', sees into the interior of the eye, and accordingly it is possible to observe the holding of the lens 11 in the capsule sack 17, and especially the anchoring of the bow of the lens in the capsule sack.

Upon forming an opening in the cutis 40 at a desired location, one can insert an instrument (not shown) therethrough and engage the lens and shove it into the capsule sack. It is therefore possible by means of the synchronous film-video technique, to practice the operation of fastening artificial intraocular lenses 11 in the eye.

Additionally the synchronous film-video technique provides many other possibilities as described elsewhere herein.

One of such possibilities, and especially valuable, is the capability of measuring the retina 39, and of measuring the mechanical stretch or compression occurring in the capsule sack 17 or in other locations of the eye.

Figure 3:
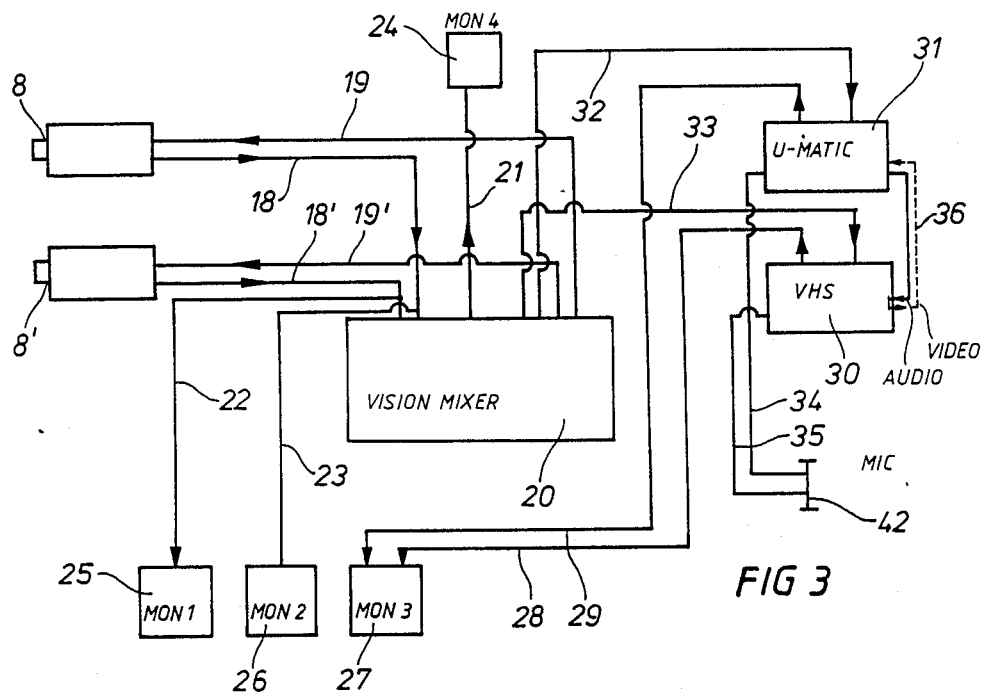
FIG. 3 is a diagram of the electrical circuit utilized in the apparatus.

FIG. 3 is a circuit diagram for providing the signals of both video camera 8, 8'. The video cameras 8, 8', are connected to the respective conductors 18, 19, or 18', 19', with a vision mixer 20 which is capable of being focused at different lengths.

The mixed pictures from the two video cameras 8, 8', are produced on the monitor 24, but also the individual pictures from the video cameras 8, 8', can be produced on individual monitors 25, 26.

The monitors 25, 26, are connected with the vision mixer 20 by conductors 22, 23, while the monitor 24 presenting the mixed picture is connected by conductor 21 to the vision mixer 20.

Conductors 32, 33, lead from the vision mixer 20 to the recorders or screens 30, 31, the former, 30, being effective in the VHS system while the other, 31, is operable in the U-matic system.

The presentation displayed on the video recorders 30, 31, can be displayed on the monitor 27 through conductors 28, 29, respectively.

Additionally by means of conductors 34, 35, the video recorders 30, 31, are connected to a microphone connection 42, for recording corresponding commentary. Both video recorders 30, 31, can be synchronized by additional conductor 36.

VARIOUS ADVANTAGES IN THE PRACTICAL APPLICATION OF THE INVENTION, IN ADDITION TO THE OBJECTS SET OUT ABOVE CONCERNING THE BROAD CONCEPT OF THE INVENTION

One extremely great advantage is the capability of observing the eye from the inside (one side) and the outside (another side), both simultaneously, by synchronous video technique.

Another great advantage, directly related to the one just stated, is the possibility of measuring the action, or motions, of the elements in the eye, during the operation.

Another immensely important advantage is, operation technique, and details of operational steps, can be performed that could not be done previously, in such movements as the implantation of the lens, by means of the insertion of an instrument through the wall of the eye, while enabling the full illuminating and observation (by video) of every detail of every step, and more particularly and specifically, such a step as implantation of the lens, and all reactions related thereto, such as stretch of the capsule sack.

A further advantage resides in the arrangement of the special lighting means, and that particularly in relation to the microscopes. Heretofore most often in the case of using a microscope, the light was so aligned as to cause a blinding effect, in that such lighting sources had an angle of incidence corresponding to the focal point of the microscope.

Another advantage is the arrangement of mounting the eye on the microscope slide, which serves as a holder or support for the eye. The slide of course enables the light to pass therethrough, and since it provides a broad support, the opening on the back side of the eye can be made at substantially any angle, and the eye will nevertheless be stably held on the slide, with the aid of glue.

The operation, including the apparatus and method, may be utilized for training operators, for testing lenses that are already on the market, for further developing lenses, and for developing new operation instruments and methods.

Still another great advantage is directly related to the synchronous video technique utilized. If for example a lens part is first implanted in the eye, the implantation of an additional lens part may cause a great deformation of the first lens part that was already implanted, pushing it out of its original and desired anchored position, and possibly being moved to another position from which it can not be removed. Such a situation can be observed only by the synchronous video technique. The behavior of the lenses that is detected and found by the synchronous video technique, does not appear in any known technical data presently existing. Additionally the compression of the lens bow may be affected by other tissues and elements of the eye. This is in great contrast to technique heretofore known and used, that is, such as heretofore been used in the laboratory producing compression curves. The present technique is much more similar to the natural condition, relative to that laboratory technique. Directly related to this step is the possibility of more closely observing, and positioning, of the elements, by the use of forming small holes in the lens which can be observed and utilized for correspondingly positioning the lens.

Also related to the marking of the lens, or other elements of the eye, is the realization of great accuracy in so measuring elements of the eye. Lines, or other gauging elements are positioned at predetermined spacing, and the video step is digitalized to cooperate therewith and provide accurate observation and recordation. Measurements taken in this step are accurate, and are the result of the relationship between the elements of the eye, which move individually somewhat, relative to other elements, and those elements can be recorded and accurately analyzed. The data thus produced, and recorded, is extremely useful in many areas, including commercial transactions, and private records.

Because the data that can be obtained by the present invention, namely the observation and recordation of relative movement between the elements of the eye, which can be provided in mathematical form, a prototype model can be made, that is extremely useful.

I claim:

1. Mechanism for observing operation on an eye having a rear opening opposite the pupil comprising,
    a microscope slide supporting the eye with the rear opening of the eye downward,
    means in the area of the rear opening adhering the eye to the microscope slide,
    means illuminating the eye,
    observation components directed at the eye from different directions and capable of making pictures of the eye,
    one of the observation components being directed through the pupil, and the other observation component being directed through the rear opening, and
    means presenting the pictures in at least one monitor.

2. Mechanism according to claim 1 wherein,
    the observation components include microscopes above and below the eye and directed through the pupil and rear opening respectively, and
    the illuminating means includes light units above and below the eye and directed into the pupil and rear opening respectively and disposed at oblique angles to the ocular axis to prevent light from each light unit from falling directly into the microscope on the respectively opposite side.

3. Mechanism according to claim 2 and including,
    foot controls for independently and selectively adjusting the observation components toward and from the object.

4. Mechanism according to claim 1, wherein,
    each observation component includes a microscope and a video camera working through the microscope,
    the mechanism includes means for mixing the pictures produced by the video cameras, and
    monitors capable of presenting the pictures.

5. Mechanism according to claim 4 wherein,
    the monitors include a first one capable of presenting blended pictures resulting from the signals from both of the video cameras.

6. Mechanism according to claim 4 wherein,
    the monitors include second and third monitors each capable of presenting pictures resulting only from signals from one individual video camera, respectively,
    the mechanism includes video recorders operable in different frequency ranges, and
    a fourth monitor capable of presenting pictures resulting from signals from each of the video records respectively.

7. Mechanism according to claim 4, or 5, or 6, wherein,
    the microscopes are provided with light filters in the oculars thereof.

8. Mechanism according to claim 4, or 5, or 6, wherein,
    identifiable points in the eye may be utilized in conjunction with a measuring device for measuring the interaction of the lens and the capsule sack of the eye.

9. Mechanism according to claim 7 wherein,
    identifiable points in the eye may be utilized in conjunction with a measuring device for measuring the interaction of the lens and the capsule sack of the eye.

10. Mechanism according to claim 1 wherein the eye has a vertical ocular axis through the pupil and rear opening of the eye, and wherein,
    the observation components include microscopes above and below the eye and directed on vertical axes through the pupil and rear opening respectively, and
    the illuminating means includes light units above and below the eye and disposed laterally of said axes of the microscopes and thereby directed into the pupil and rear opening respectively at oblique angles to said axes of the microscopes to prevent light from each light unit from falling directly into the microscope on the respectively opposite side.

11. Mechansim for observing operation on an object having interacting elements, comprising,
    microscopes operably directed to respectively different ones of the elements,
    video cameras working through respectively different ones of the microscopes,
    lighting means for illuminating respectively different ones of the elements,
    the microscopes, video cameras, and lighting means corresponding to the respective interacting elements being separate and independent from each other, and the video cameras being operable for making pictures independently of each other,
    a monitor capable of having the pictures from the video cameras presented thereon, and
    means operable for presenting the pictures on said monitor.

12. A method of observing operation of an object having interacting elements, comprising, directing video cameras to individual interacting elements respectively in operable relation thereto, directing lighting means to individual interacting elements respectively in illuminating relation thereto, so directing lighting means all independently of each other, presenting pictures made by video cameras onto monitors independently of each other.

13. A method according to claim 12 and including the steps, directing a microscope to each of the interacting elements, and directing video cameras operably through microscopes, and so directing lighting means in non-glare directions to the interacting elements.

14. A method according to claim 13 and including the steps, producing pictures from video cameras on monitors, individually from video cameras, and as mixed from all video cameras, selectively.

* * * * *